(12) United States Patent
Lv

(10) Patent No.: US 12,555,328 B2
(45) Date of Patent: Feb. 17, 2026

(54) VIDEO PLAYING METHOD AND APPARATUS, ELECTRONIC DEVICE, AND STORAGE MEDIUM

(71) Applicant: Beijing Bytedance Network Technology Co., Ltd., Beijing (CN)

(72) Inventor: Qingyang Lv, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 371 days.

(21) Appl. No.: 18/250,505

(22) PCT Filed: Aug. 30, 2021

(86) PCT No.: PCT/CN2021/115208
§ 371 (c)(1),
(2) Date: Apr. 25, 2023

(87) PCT Pub. No.: WO2022/088908
PCT Pub. Date: May 5, 2022

(65) Prior Publication Data
US 2024/0062479 A1 Feb. 22, 2024

(30) Foreign Application Priority Data
Oct. 28, 2020 (CN) .......................... 202011173352.9

(51) Int. Cl.
*G06T 19/00* (2011.01)
*H04N 21/434* (2011.01)
*H04N 21/472* (2011.01)

(52) U.S. Cl.
CPC ....... *G06T 19/006* (2013.01); *H04N 21/4341* (2013.01); *H04N 21/47217* (2013.01)

(58) Field of Classification Search
None
See application file for complete search history.

(56) References Cited

U.S. PATENT DOCUMENTS

2013/0050500 A1   2/2013  Makino et al.
2017/0089714 A1*  3/2017  Liu .......................... G01S 19/42
(Continued)

FOREIGN PATENT DOCUMENTS

CN    103346955 A    10/2013
CN    105989628 A    10/2016
(Continued)

OTHER PUBLICATIONS

China National Intellectual Property Administration, International Search Report and Written Opinion Issued in Application No. PCT/CN2021/115208, Nov. 17, 2021, WIPO, 12 pages.
(Continued)

*Primary Examiner* — Tapas Mazumder
(74) *Attorney, Agent, or Firm* — Alleman Hall LLP

(57) ABSTRACT

A video playing method and apparatus, an electronic device, a storage medium, a computer program product, and a computer program. A live-action shooting image is acquired, a display position of a target image in the live-action shooting image is detected and determined, a target video associated with the target image is acquired, and the target video is played at the display position in the live-action shooting image, so that the production cycle and costs required when presenting information using an augmented reality display technique can be reduced; in addition, more presentation channels are provided for users to present video information, so that the users can have enhanced interactive experience and visual experience.

19 Claims, 7 Drawing Sheets

(56) References Cited

U.S. PATENT DOCUMENTS

2019/0034976 A1* 1/2019 Hamedi ............. G06Q 30/0243
2020/0272223 A1* 8/2020 Joiner ................... G06V 20/20
2022/0392172 A1* 12/2022 Focke .................. G06V 10/225

FOREIGN PATENT DOCUMENTS

| CN | 109168034 A | 1/2019 |
| CN | 110809187 A | 2/2020 |
| CN | 111273775 A | 6/2020 |
| CN | 111337015 A | 6/2020 |
| CN | 111339365 A | 6/2020 |
| CN | 111833460 A | 10/2020 |
| CN | 112288877 A | 1/2021 |
| WO | 2018007779 A1 | 1/2018 |

OTHER PUBLICATIONS

China National Intellectual Property Administration, Office Action and Search Report Issued in Application No. 202011173352.9, Dec. 14, 2023, 10 pages. (Submitted with Concise Explanation of Relevance).

\* cited by examiner

VIDEO PLAYING METHOD AND APPARATUS, ELECTRONIC DEVICE, AND STORAGE MEDIUM

CROSS-REFERENCE TO RELATED APPLICATIONS

This application is a National Stage of International Application No. PCT/CN2021/115208, filed on Aug. 30, 2021, which claims priority to Chinese patent application No. 202011173352.9, filed on 28 Oct. 2020, entitled "VIDEO PLAYING METHOD AND APPARATUS, ELECTRONIC DEVICE, AND STORAGE MEDIUM", the contents of both applications are incorporated herein by reference.

TECHNICAL FIELD

Embodiments of the present disclosure relate to the field of computers, in particular, to a video playing method and apparatus, an electronic device, a storage medium, a computer program product, and a computer program.

BACKGROUND

Augmented reality (AR) technology is a technique of artfully blending virtual information with the real world.

Using augmented reality to present information has become a possible way of presenting information. In the prior art, a three-dimensional modeling image is pre-build for a virtual character or a virtual scene to be presented, so that a user can, while performing live-action shooting with a terminal, synchronously acquire a live-action shooting image including the three-dimensional modeling image.

However, presenting information in this way would require a large amount of three-dimensional modeling images to be pre-built, resulting in high building cost and long building cycle that are undesirable for rapid presentation of information.

SUMMARY

Accordingly, embodiments of the present disclosure have provided a video playing method and apparatus, an electronic device, a storage medium, a computer program product, and a computer program.

In a first aspect, an embodiment of the present disclosure provides a video playing method, including:
  acquiring a live-action shooting image;
  detecting a target image in the live-action shooting image;
  determining a display position of the target image in the live-action shooting image;
  acquiring a target video associated with the target image, and playing the target video at the display position of the target image in the live-action shooting image.

In a second aspect, an embodiment of the present disclosure provides a video playing apparatus, including:
  a processing module, configured to acquire a live-action shooting image, detect a target image in the live-action shooting image, and determine a display position of the target image in the live-action shooting image;
  a playing module, configured to: acquire a target video associated with the target image, and play the target video at the display position of the target image in the live-action shooting image.

In a third aspect, an embodiment of the present disclosure provides an electronic device, including: at least one processor and a memory,
  where the memory stores therein computer executable instructions; and
  the at least one processor executes the computer executable instructions stored in the memory to cause the at least one processor to execute the video playing method according to the above first aspect and various possible designs thereof.

In a fourth aspect, an embodiment of the present disclosure provides a computer readable storage medium, storing therein computer executable instructions which, when being executed by a processor, implement the video playing method according to the above first aspect and various possible designs thereof.

In a fifth aspect, an embodiment of the present disclosure provides a computer program product, including a computer program which, when being executed by a processor, implements the video playing method according to the above first aspect and various possible designs thereof.

In a sixth aspect, an embodiment of the present disclosure provides a computer program which, when being executed by a processor, implements the video playing method according to the above first aspect and various possible designs thereof.

Embodiments of the present disclosure have provided a video playing method and apparatus, an electronic device, a storage medium, a computer program product, and a computer program. The method includes: acquiring a live-action shooting image, detecting a target image in the live-action shooting image; determining a display position of the target image in the live-action shooting image; acquiring a target video associated with the target image; and playing the target video at the display position of the target image in the live-action shooting image. According to the video playing method provided in the embodiments of the present disclosure, the presentation cost and the production cycle can be reduced for presenting information using the augmented reality display technology. On the other hand, more presentation channels are provided for users to display video information, so that the users can obtain better interaction experience and visual experience.

BRIEF DESCRIPTION OF THE DRAWINGS

In order to more clearly illustrate the embodiments of the present disclosure or the technical solutions in the prior art, the drawings required in describing the embodiments or the prior art will be briefly introduced below. Apparently, the drawings described in the following are for some embodiments of the present application, and other drawings can be obtained by those of ordinary skill in the art from these drawings without paying any creative labor.

DESCRIPTION OF EMBODIMENTS

In order to make objectives, technical solutions and advantages of embodiments of the present disclosure clearer, the technical solutions in the embodiments of the present disclosure will be described hereunder clearly and comprehensively with reference to accompanying drawings in the embodiments of the present disclosure. Obviously, the described embodiments are only a part of embodiments of the present disclosure, rather than all of them. Based on the embodiments of the present disclosure, all other embodiments obtained by persons of ordinary skill in the art without making any creative effort shall fall within the protection scope of the present disclosure. Augmented reality (AR) technology is a technique of artfully blending virtual information with the real world.

When augmented reality display is performed, a terminal may first shoot a live-action of a real scene to acquire a current live-action shooting image. Then, the augmented reality technology is used to process the live-action shooting image, so as to superimpose preset virtual information over the live-action shooting image, and present the superimposed view to the user.

Typically, the virtual information superimposed over the live-action shooting image is usually a three-dimensional modeling image of a pre-created virtual character or virtual scene. However, the building process of the three-dimensional modeling image is relatively complex, and the technical cost and the labor cost required during the building are relatively high. Hence, when the augmented reality display technology is used to present information, extended production cycle and high cost would be required for presenting each piece of information.

With these problems in view, the inventor had, after researches, creatively realized that the information presentation mode does not have to be limited to a three-dimensional modeling image. Rather, the existing mode can be replaced by a mode with lower technical cost and lower labor cost. According to the method of the embodiments of the present disclosure, some existing video data can be placed into a live-action shooting image and be displayed in an augmented reality display manner. In this way, the production cycle and the presentation cost can be reduced for presenting information using the augmented reality display technology. On the other hand, more presentation channels would be available for the user to display video information, so that the user can obtain better interaction experience and visual experience.

Figure 1:
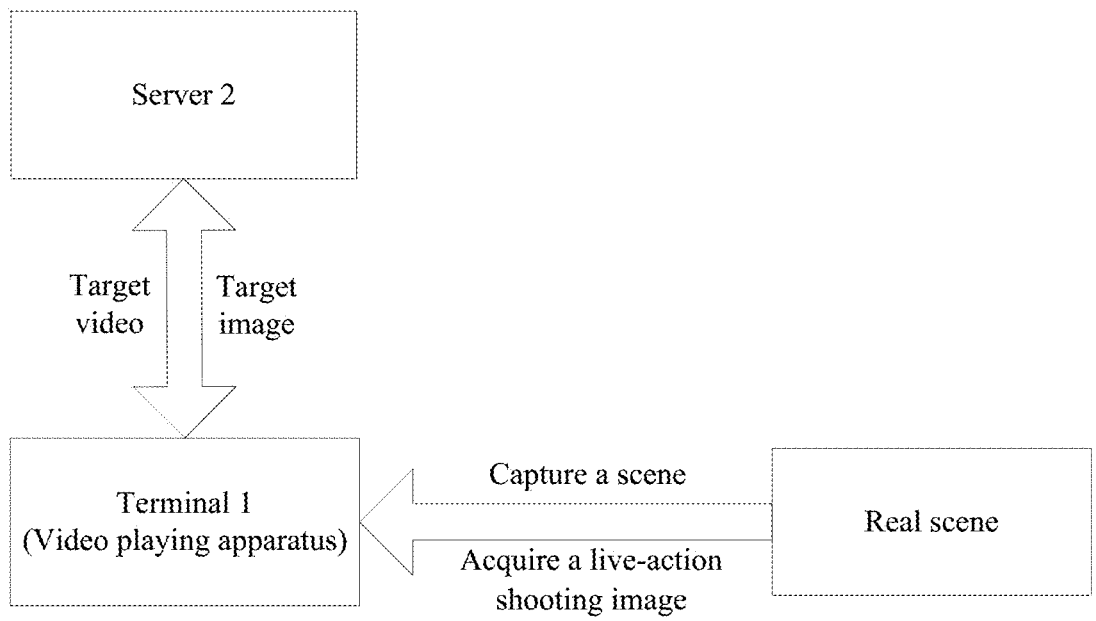
FIG. 1 is a schematic diagram of a network architecture on which an embodiment of the present disclosure is based.

Reference may be made to FIG. 1, which is a schematic diagram of a network architecture on which an embodiment of the present disclosure is based. The network architecture shown in FIG. 1 may specifically include a terminal 1 and a server 2.

The terminal 1 may be specifically a hardware device, such as a user mobile phone, a smart home device, a tablet computer, a wearable device, or the like, which may be used to capture a real scene and display the same. The terminal 1 may be integrated or installed with a video playing apparatus. The video playing apparatus is hardware or software, which is configured to perform the video playing method of the present disclosure. The video playing apparatus may provide the terminal 1 with a display page for the augmented reality display. Additionally, the terminal 1 may use a screen or a display component thereof to show the display page of the augmented reality display provided by the video playing apparatus to the user.

The server 2 may be specifically a server or a server cluster deployed on a cloud, and the server or the server cluster may store therein video data, image data, etc., related to the video playing method provided by the present disclosure.

Specifically, when the video playing method provided by the present disclosure is executed, the video playing apparatus may further interact with the server 2 by using a network component of the terminal 1 to acquire the image data and the video data stored in the server 2, and perform corresponding processing and display.

The architecture shown in FIG. 1 can be applicable to the field of information presentation. In other words, it can be used for information presentation in various scenarios.

For example, the video playing method provided by the present disclosure may be applicable to a gaming scene based on augmented reality display. For example, in some "treasure hunting" games based on augmented reality display technology, the video playing method provided by the present disclosure may be used to push and present a "clue" video during a "treasure hunting" journey.

For example, the video playing method provided by the present disclosure may be applicable to an advertisement scene based on augmented reality display. For example, for some goods or products, the video playing method provided by the present disclosure can be implemented to present related videos of the goods, so that richer information about the goods can be provided to the user, enhancing the user experience.

For another example, in scenarios where "cloud-based curation" is performed for landmark buildings, museums or the like based on augmented reality display technology, pictures of the "cloud-based curation" needed for a "landmark", "building", "museum collection" and "historical photo" can be played via the video playing method provided by the present disclosure, so that videos relevant thereto can be made available, hence providing enhanced service to the user.

Other than the above, in some daily life scenarios where shooting function is used, video information can be played using the video playing method provided by the present disclosure, so that richer information about the scene can be presented to the user, enriching the interaction experience for the user.

For still another example, in a scenario where a terminal camera needs to be turned on so as to perform live-action shooting, such as "scan to pay", "take a photo" or the like, the video playing method provided in the present disclosure may be executed at the same time to complete information presentation in various daily life scenarios.

Now, the video playing method provided by the present disclosure will be further described.

Figure 2:
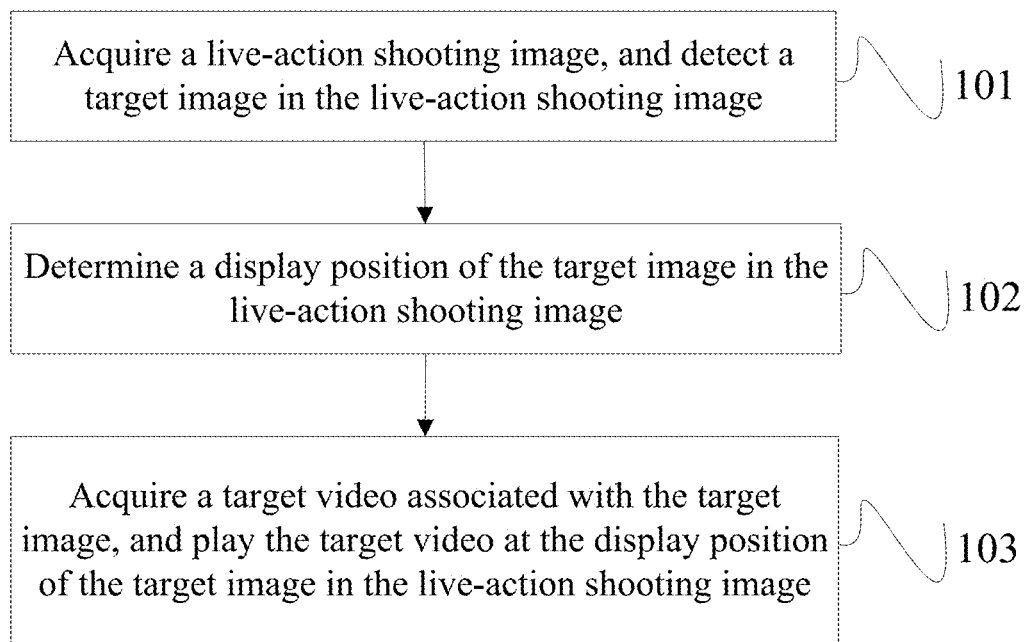
FIG. 2 is a schematic flowchart of a video playing method provided in an embodiment of the present disclosure.

FIG. 2 is a schematic flowchart of a video playing method provided in an embodiment of the present disclosure. Referring to FIG. 2, an embodiment of the present disclosure provides a video playing method, including:

Step 101: acquire a live-action shooting image, and detect a target image in the live-action shooting image;

Step 102: determine a display position of the target image in the live-action shooting image;

Step 103: acquire a target video associated with the target image, and play the target video at the display position of the target image in the live-action shooting image.

It should be noted that, the entity that carries out the processing method as provided in this embodiment is the aforementioned video playing apparatus which, in some embodiments of the present disclosure, can be more specifically understood as a client or a display panel installed or integrated on a terminal. The user may operate the video playing apparatus through the terminal, so that the video playing apparatus may respond to the operation triggered by the user.

Figure 3:
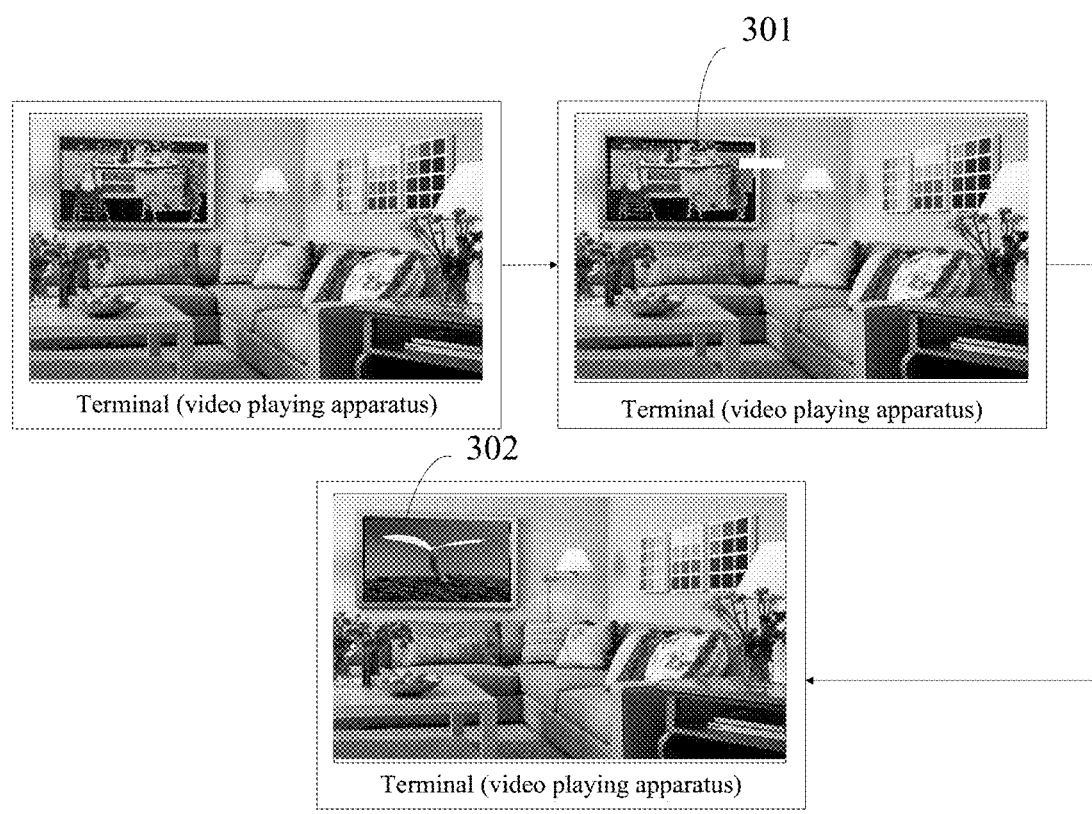
FIG. 3 is a schematic diagram of a first interface of a video playing method provided in an embodiment of the present disclosure.

FIG. 3 is a schematic diagram of a first interface of a video playing method provided in an embodiment of the present disclosure.

Initially, as shown in FIG. 3, the video playing apparatus acquires a live-action shooting image that may be an image acquired by the terminal using its own shooting component to shoot a current surrounding, or may be a real-time image of the live-action acquired by the video playing apparatus via other means.

Then, the video playing apparatus performs image recognition on the live-action shooting image to determine whether there is a target image in the live-action shooting image that can be used for video playing. It can be understood that the recognition of the target image in the live-action shooting image by the video playing apparatus may be implemented using an image recognition technology. In an embodiment, the target image may be a two-dimensional planar image, and the corresponding display position may be a position where the two-dimensional planar graph is located. In an embodiment, the target image may be an image of a three-dimensional object, and the corresponding display position may be a projection position where the three-dimensional object is projected onto a two-dimensional plane. The image recognition technology according to an embodiment of the present disclosure may be implemented based on a two-dimensional image recognition technology, that is, using the image recognition technology, image recognition may be performed on a preset planar image, and a projection surface of a three-dimensional object, and a planar image or a plane picture with some distortion. Other than that, when the target image includes an image of a three-dimensional object, an embodiment according to the present disclosure may be implemented using an object-based recognition technology. The present disclosure is not specifically limited to any specific image recognition technology.

By performing image recognition on the live-action shooting image, the video playing apparatus can detect the display position of the target image in the live-action shooting image. As shown in FIG. 3, the target image may include an image in the image frame as illustrated in FIG. 3. Correspondingly, the display position may be framed using the image frame 301 that is used to represent a playing area of the target video. The display position of the target image may specifically be determined by the image position of the target image, and the image position may include, but is not limited to, an image edge position, an image vertex position, etc., of the target image.

Then, the video playing apparatus may determine a target video associated with the target image, and play the target video at a display position where the target image should be located in the live-action shooting image.

In order to enable playing the video at the display position of the image during the above process, a rendering process based on three-dimensional space needs to be performed on the target video according to the display position of the image, so that the video picture of the target video can be adapted to the display position and be played.

In a specific implementation, the corresponding playing area in the live-action shooting image can be determined according to the display position. Then, the target video would be subjected to video preprocessing according to the playing area, and the target video would be played at the playing area.

It could be understood that the above-mentioned display position is referring to an area occupied by an image of the target image in the live-action shooting image, and may include an image edge position, or/and an image vertex position.

Therefore, when the playing area is determined, a corresponding image box can be partitioned from the live-action shooting image according to the image edge position, or/and the image vertex position of the target image, so as to serve as the playing area (e.g., 301 as shown in FIG. 3).

Then, three-dimensional space rendering processing may be performed on video data of the target video according to a spatial feature of the playing area in the live-action shooting image, so as to play the target video in the playing area (e.g., 302 as shown in FIG. 3).

The spatial feature is used for representing spatial position attributes of the playing area in the three-dimensional space of the live-action shooting image, such as spatial position coordinates of a vertex of the playing area, spatial position coordinates of an edge of the playing area, information about a spatial angle between the plane where the playing area is located and the surface from which the live-action shooting image is taken, or the like.

By bringing in the spatial feature of the playing area, three-dimensional space rendering processing can be performed on the video data of the target video, so that the rendered video picture of the target video can be adapted to the playing area in three-dimensional space. In an embodiment, the three-dimensional space rendering processing may include pixel coordinate mapping processing, that is, two-dimensional pixel coordinates of pixels in a video picture of the target video are mapped to three-dimensional coordinates of the playing area by way of spatial mapping. Certainly, the three-dimensional space rendering processing may also be implemented in other manners, which would not be limited in this application.

Finally, the effect of playing the target video at the display position in the live-action shooting image is realized.

In order to facilitate rapid establishment of the association relationship between the target video and the target image and lend convenience to quickly acquire the target video associated with the target image, in an alternative embodiment, the association relationship between the target video and the target image is pre-established and stored in the aforementioned server.

Figure 4:
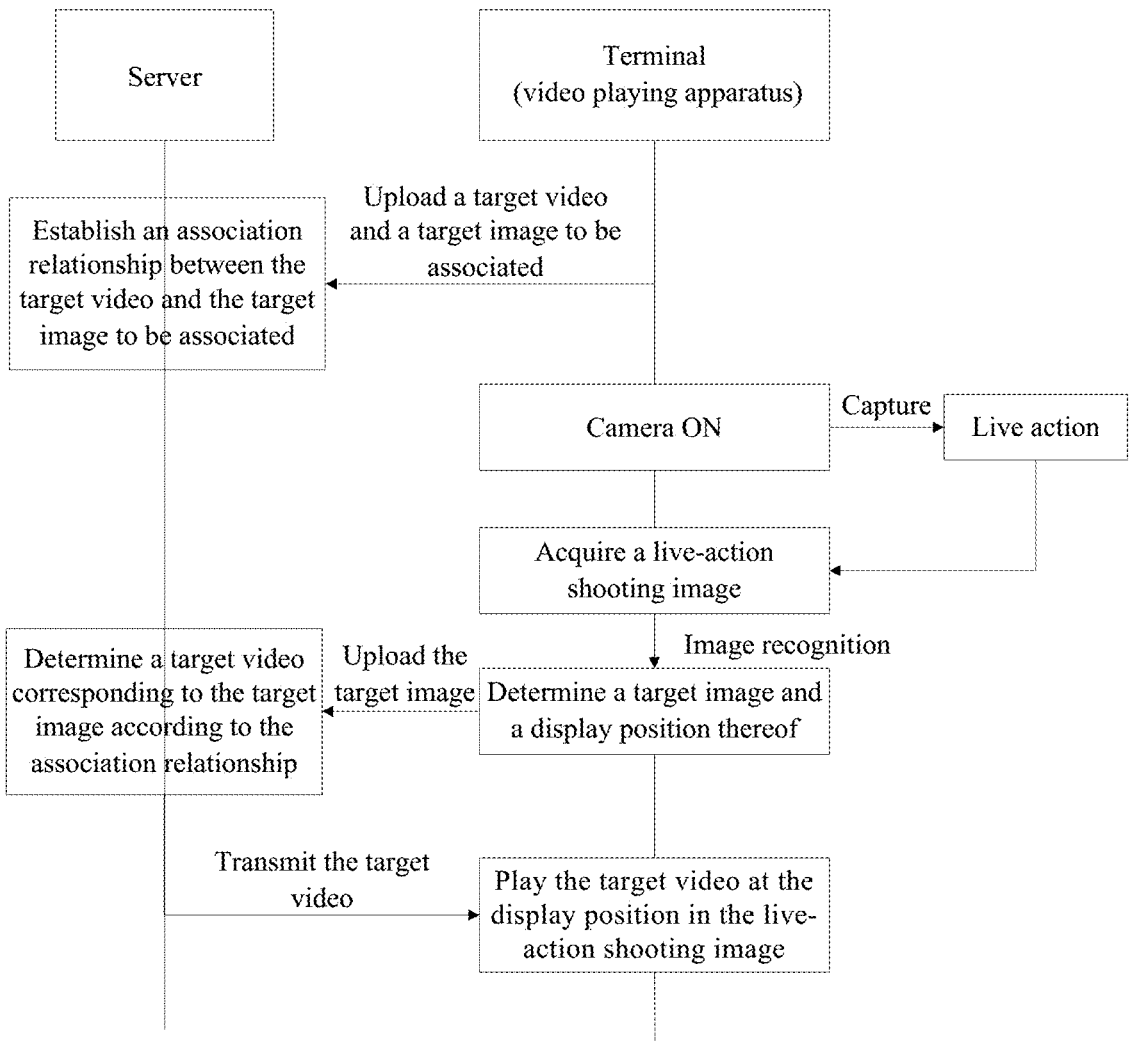
FIG. 4 is a signaling interaction diagram of a video playing method provided in an embodiment of the present disclosure.

FIG. 4 is a signaling interaction diagram of a video playing method provided in an embodiment of the present disclosure. The association relationship between the target image and the target video is pre-established in the server in a way as illustrated in FIG. 4.

Figure 5:
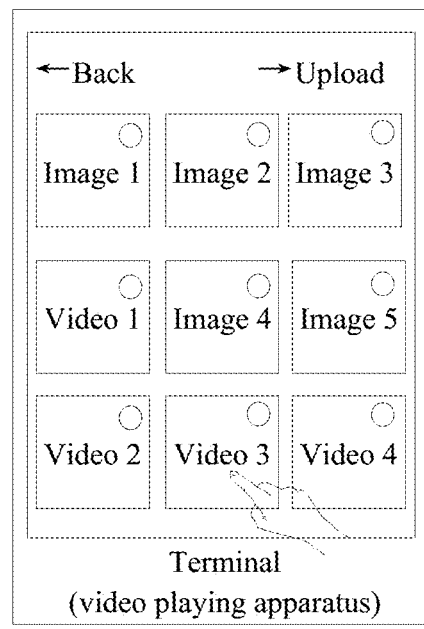
FIG. 5 is a schematic diagram of a second interface of a video playing method provided in an embodiment of the present disclosure.

Initially, a terminal may acquire an image and a video through various means, and then upload, via an interface (e.g., the interface as shown in FIG. 5), the target image and the target video that are yet to be associated to a server. The image and the video may be acquired by the terminal through shooting, or be downloaded by the terminal via a network, or be acquired from other terminals via near-field transmission means, which would not be limited in this disclosure.

Then, the server would, after receiving the target image and the target video that are yet to be associated, store the target image and the target video in association to determine the association relationship between the target image and the target video. Specifically, the server may be pre-stored with a storage list having an association relationship, for storing an association relationship between each to-be-associated image and video uploaded by a different terminal, and the specific storage manner thereof will be described in the following embodiments, which will not be limited herein.

Then, after a camera is turned on for the terminal, the video playing method would be executed in the foregoing manner, that is, the terminal shoots the real scene to acquire a corresponding live-action shooting image, and then performs image recognition on the live-action shooting image to acquire a target image in the live-action shooting image, and then determines the display position of the target image and transmits the target image to the server.

At this point, the server determines a target video corresponding to the target image according to the pre-established association relationship in the storage list, and transmits the target video to the terminal. Finally, after receiving the target video, the terminal plays the target video at the display position of the target image in the live-action shooting image.

It should be noted that, although FIG. 4 has illustrated using the same terminal for both the uploading of the to-be-associated target image and target video and the implementing of the disclosed video playing method, in another example or actual use, different terminals could be used for the uploading of the to-be-associated target image and target video and the implementing of the disclosed video playing method. That is, the present application does not impose any limitation on whether the terminal uploading the target image and the target video to be associated is the same terminal using the present solution for video playing, and a person skilled in the art would be at liberty to make the decision.

In particular, according to the technical solution provided in the present disclosure, the target video associated with the target image can be directly played without the three-dimensional virtual modeling process. Therefore, the information owner who needs to present the information can quickly associate the target image with the target video through the operations that will be explained later, so that more users could acquire the information that the information owner intends to present, and at significantly reduced cost and less difficult preparation.

Specifically, FIG. 5 is a schematic diagram of a second interface of a video playing method provided in an embodiment of the present disclosure. As shown in FIG. 5, the terminal stores materials in the form of images and videos. A user (or information owner) may perform an operation to select a target image (e.g., the Image 2 as shown in FIG. 5) and a target video (e.g., the Video 3 as shown in FIG. 5) to be associated. That is, firstly, the video playing apparatus determines, in response to an uploading operation triggered by the user (or information owner), a target image and a target video that are to be associated. Then, the video playing apparatus uploads the target image and the target video that are to be associated to a server for associated storage by the server for the target image and the target video that are to be associated.

The associated storage may be done in a plurality of manners. For example, respective identifier IDs could be assigned to the image and the video. The two identifier IDs could then be correspondingly stored when storing the target image and the target video that are to be associated. In other words, the terminal may transmit the target image to the server in a specific implementation that involves the terminal transmitting the identifier ID of the target image to the server so that the server could locate the target image having a corresponding identifier ID from a pre-stored massive amount of images according to the identifier ID of the target image, and dispatch the corresponding target video.

Certainly, in other associated storage, the target image and the target video that are to be associated may be stored by being encrypted (and later decrypted) using symmetric keys. For example, upon storing, the target image may be processed to obtain a unique key which is used to encrypt the target video associated with the target image before storing the encrypted target video. When needed later, the target image can be processed again to obtain the aforementioned unique key which is used to locate a decrypt-able video among a plurality of stored videos, and that video would be the target video.

After completing the above arrangements for the target image and the target video, the user (or information receiver) would view the target video (e.g., Video 3) associated with the target image (e.g., Image 2) on the terminal using the method provided in the foregoing embodiments.

Upon use, the terminal transmits the detected target image to the server, and then receives the target video, which is associated with the target image, returned by the server. It should be noted that the terminal may transmit image data of the target image to the server, or may analyze and process the image data of the target image to obtain an image identifier ID and/or an image feature of the target image and then transmit the image identifier ID and/or the image feature to the server. Regardless of whether image data, image identifier ID or image feature is used, the server can always determine the corresponding target video according to a pre-established association relationship, and transmit the corresponding target video to the terminal for display.

It should be noted that, when the target image and the target video that are uploaded by the user to be associated are being received, the user can simultaneously upload at least one group of target images and target videos that are to be associated. Different groups of target images and target videos that are to be associated can be identified in association using different identifiers, so that the server can perform associated storage for different groups of target images and target videos that are to be associated. In this way, the configuration efficiency of the target images and the target videos that are to be associated can be greatly improved. By uploading multiple groups of associated target images and target videos, the presentation of video information for multiple target images can be realized, improving the interaction experience of the user.

It may be understood that the user who uploads the target image and the target video that are to be associated may or may not be the same as the user who uses the disclosed solution to perform the video playing. Taking the foregoing actual application scenario as an example, in a scenario where goods or products are presented using the video playing method provided herein, the user who uploads the target image and the target video that are to be associated may specifically be a marketer of the product, or a promoter of the video about the goods, and the user who uses the disclosed solution to perform the video playing may specifically be a user of the product, a person who receives or views the video about the goods.

Figure 6:
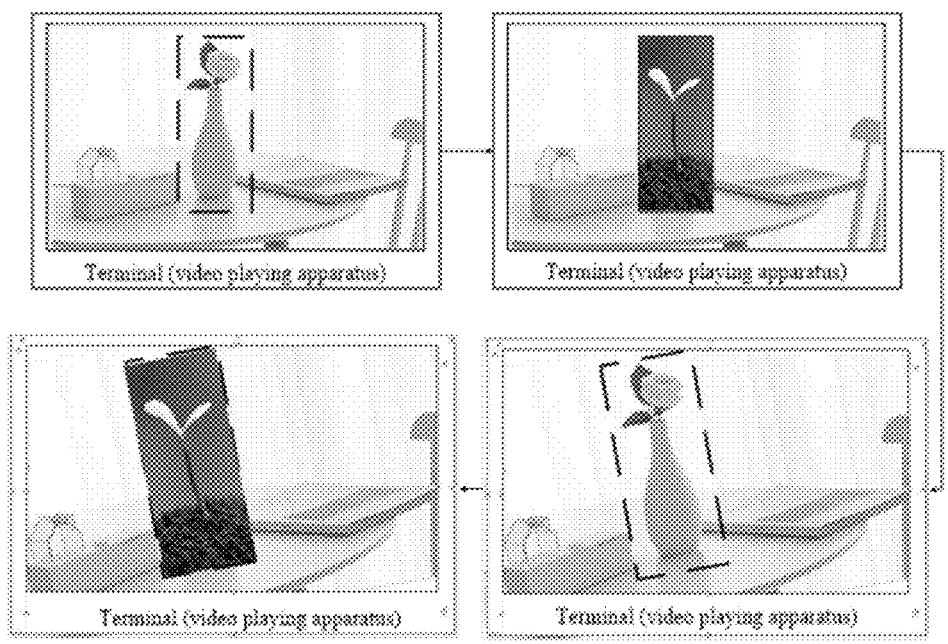
FIG. 6 is a schematic diagram of a third interface of a video playing method provided in an embodiment of the present disclosure.

Additionally, FIG. 6 is a schematic diagram of a third interface of a video playing method provided in an embodiment of the present disclosure. In some embodiments, the target image may include an image of a three-dimensional object in the live-action shooting image. By identifying the image of the three-dimensional object, a two-dimensional plane formed by surface projection of the three-dimensional object thereto can be used as a display position of the target image, and the video associated with the target image could be displayed at that display position. As shown in FIG. 6, where a vase in FIG. 6 has been illustrated as a target image for ease of description only, the video associated with the vase could be played at a projection plane of the vase.

In addition, in an embodiment, the video playing apparatus would, while continuously playing the target video, constantly track the display position of the target image, so that the playing position of the target video can be correspondingly adjusted according to any change in the display position of the target image, thereby playing the target video at a real-time display position of the target image. Therefore, as shown in FIG. 6, the vase in FIG. 6 will be taken as an example for description. When the shooting angle of the live-action shooting image changes (e.g., the shooting angle of the vase changes), the display position of the recognized target image would also change correspondingly. Upon this, the video playing apparatus would adjust the position and size of an image frame in real time and display the target video in the adjusted image frame (i.e., a playing area). In the scheme shown in FIG. 6, initially, a lateral surface (or a projection surface) of a target image vase (or a three-dimensional object) is captured from a vertical angle. At this point, a display position of the target image vase can be identified, and a corresponding target video could be displayed at the display position. Then, the camera may be rotated to adjust the shooting angle. At this point, it can be recognized that the display position of the lateral surface (or the projection surface) of the target image vase (or the three-dimensional object) has undergone some adjustments, and the corresponding target video may be displayed at the adjusted display position.

In addition, in other embodiments, in order to provide more information, a user may perform a trigger operation on the target video to switch the display interface of the video playing apparatus, so that information associated with the target video can be displayed. That is, the video playing apparatus would determine, in response to the trigger operation from the user on the played target video, information being triggered and associated with the target video, and present the information.

The information associated with the target video may be webpage information, some other image information, program information of other applications, or the like. For example, the target image may be an image of a product, and the target video shows a product usage method of a branded product. In this case, the associated information may be a webpage introducing the branded product, or a purchase link linking to the branded product in an online shopping mall APP. For another example, the target image may be an image of a tourist attraction, the target video is a video advertising the tourist attraction, and the associated information may be additional pictures of that tourist attraction, or a webpage on an official website introducing the tourist attraction, or may be ticketing information of the tourist attraction, or the like.

In addition, in some other embodiments, the video playing apparatus further supports breakpoint-based playing for the target video. That is, when a display position of a target image corresponding to a target video is lost from the live-action shooting image (e.g., the playing of the target video has progressed to 00':30") but later recovered within a preset interval, the video playing apparatus may resume the playing progress of the target video (i.e., resume playing from 00':30") and continue the playing (i.e., from 00':30" onwards).

That is to say, when the video playing apparatus is playing the target video, the playing progress of the target video is also obtained, and the target video is played according to the playing progress.

In an alternative implementation, the video playing apparatus may store the playing progress of the target video, e.g., current playing moment information or the like. Each time the target video is played, the video playing apparatus may first extract the playing progress, e.g., the current playing moment information of the target video, and then determine the starting moment of this playing, and finally play the target video from that starting moment. In this way, the resuming function (playing from the breakpoint) of the target video is realized, further improving the audio-visual experience of the user.

On the basis of the foregoing embodiments, more than one target image is obtainable by performing recognition on the live-action shooting image in the video playing method provided in the present disclosure. That is to say, when the video playing apparatus performs image recognition on the live-action shooting image, multiple target images can be recognized from the image, and the target videos corresponding to the multiple target images can be played at the same time.

Figure 7:
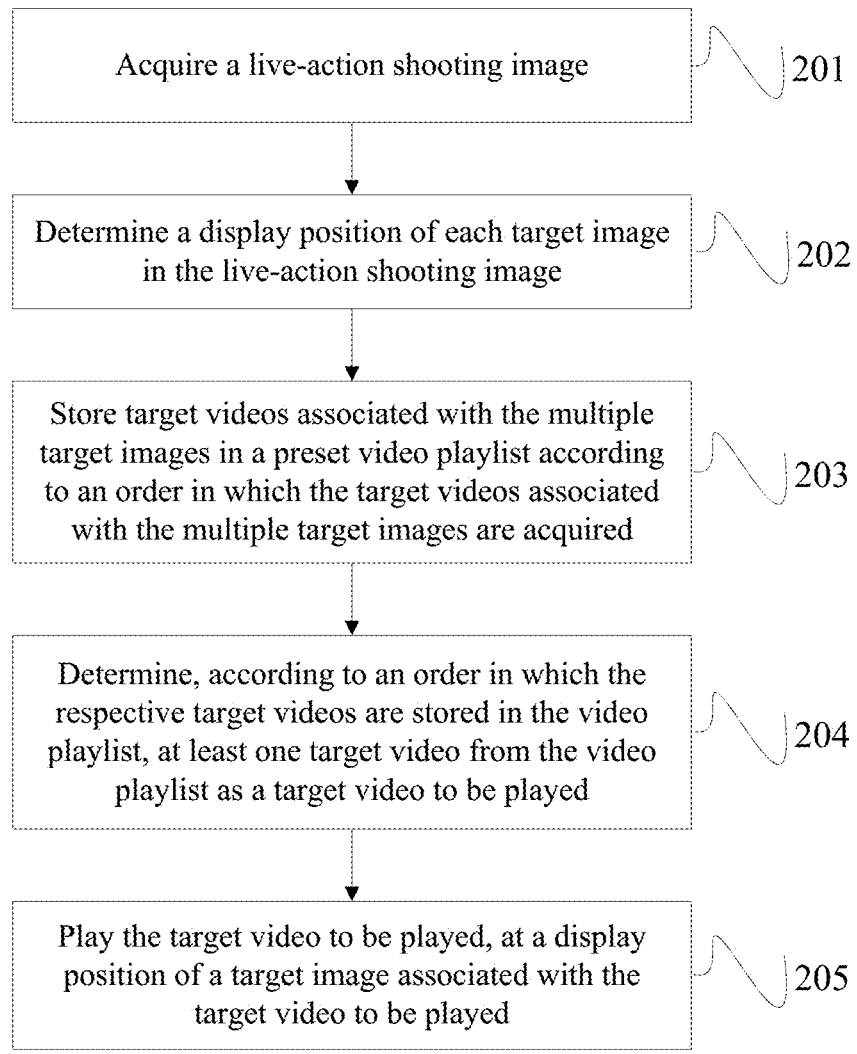
FIG. 7 is a schematic flowchart of another video playing method provided in an embodiment of the present disclosure.

FIG. 7 is a schematic flowchart of another video playing method provided in an embodiment of the present disclosure. As shown in FIG. 7, the method includes:

Step 201: acquire a live-action shooting image;

Step 202: determine a display position of each target image in the live-action shooting image;

Step 203: store target videos associated with multiple target images in a preset video playlist according to an order in which the target videos associated with the multiple target images are acquired;

Step 204: determine, according to an order in which the respective target videos are stored in the video playlist, at least one target video from the video playlist as a target video to be played;

Step 205: play the target video to be played, at a display position of a target image associated with the target video to be played.

It should be noted that, the entity that carries out the processing method as provided in this embodiment is the aforementioned video playing apparatus which, in some embodiments of the present disclosure, can be more specifically understood as a client or a display panel installed or integrated on a terminal. The user may operate the video playing apparatus through the terminal, so that the video playing apparatus may respond to the operation triggered by the user.

Unlike the previous embodiment, in this embodiment, the live-action shooting image includes multiple target images therein, and the video playing apparatus respectively determines a display position for each of the target images in the live-action shooting image, and plays a target video associated with the target image at a corresponding display position. As for how an individual target video is played at a corresponding display position, reference may be made to the foregoing contents for more details, which will not be repeated herein.

In the above process, in case there are a significant number of target videos, playing all of them at the same time might cause lagging or stagnating on the terminal. Therefore, in order to ensure a better video playing effect, as well as better visual experience for the user, a video playlist may be provided in the video playing apparatus for setting the number of target videos that are allowed to be simultaneously played in the live-action shooting image.

Figure 8:
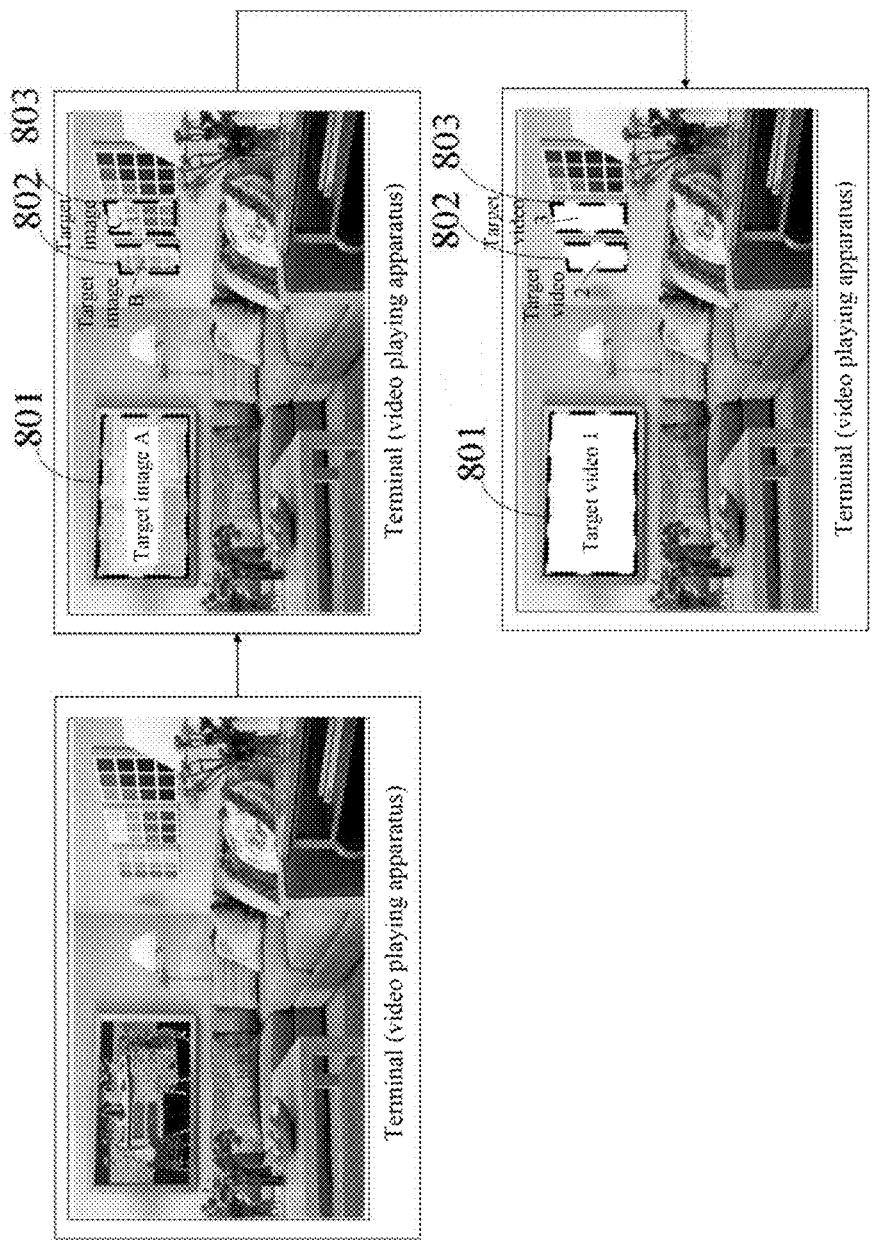
FIG. 8 is a schematic diagram of a fourth interface of a video playing method provided in an embodiment of the present disclosure.

Specifically, FIG. 8 is a schematic diagram of a fourth interface of a video playing method provided in an embodiment of the present disclosure. As shown in FIG. 8, firstly, the video playing apparatus acquires a live-action shooting image, then performs image recognition on multiple target images in the live-action shooting image, and sequentially mark the display positions of the target images in the live-action shooting image using image frames to obtain a plurality of image frames (playing areas). As shown in FIG. 8, the playing area corresponding to the target image A is 801, the playing area corresponding to the target image B is 802, and the playing area corresponding to the target image C is 803.

Then, the video playing apparatus transmits the respective target images to the server so that the server can determine target videos corresponding to the target images according to a preset association relationship and return the respective target videos to the video playing apparatus.

After receiving the target videos, the video playing apparatus stores the target videos in a video playlist. In playing the target videos, the video playing apparatus selects, according to an order in which the target videos are stored into the video playlist, one or more target videos as the target video(s) to be played, and plays each target video in a playing area of the target image associated the target video. For example, a target video 1 associated with a target image A is played in a corresponding playing area 801, a target video 2 associated with a target image B is played in a corresponding playing area 802, and a target video 3 associated with a target image C is played in a corresponding playing area 803.

It should be noted that all target videos obtained from the server ever since the live-action shooting image was acquired are stored in the video playlist. For the video playlist, a cycle for clearing up the list can also be determined, according to which the target videos stored in the list can be cleared up.

In addition, the time in which the target videos are acquired is further stored in the video playlist. When storing individual target videos into the video playlist, the target videos will be put into the video playlist according to a temporal reverse order in which the target videos are acquired. In other words, a target video more recently acquired will be stored closer to the top of the video playlist and be prioritized for playing.

In other embodiments, in case all of the videos include audios, playing the audios of the plurality of target videos all at the same time could jeopardize the visual experience and the information acquisition experience of the user. In order to prevent that problem, this embodiment enables separated playing of the audio and the video. For example, when multiple video pictures for multiple to-be-played target videos are being played at the same time, the audio data of only one of the target videos will be played.

Specifically, for target videos to be played, various to-be-played target videos can be decoded to obtain audio data and video data thereof. The video data of the various to-be-played target videos is played, but only the audio data of the to-be-played target video that is most recently acquired and stored in the video playlist is played.

For the target video corresponding to the currently played audio data, the audio data and the video data of the target video are synchronously processed using an audio and video synchronization technology, so as to ensure the audio and video are in synchronization during playing. In this way, the user will only hear the sound of one target video at any one time instant while viewing multiple pictures of the plurality of target videos. Hence, more video information can be seen without compromising the audio-visual experience.

An embodiment of the present disclosure has provided a video playing method that includes: acquiring a live-action shooting image; detecting a target image in the live-action shooting image; determining a display position of the target image in the live-action shooting image; acquiring a target video associated with the target image; and playing the target video at the display position of the target image in the live-action shooting image. According to the video playing method provided by the embodiment of the present disclosure, the production cycle and the cost can be reduced for presenting information using the augmented reality display technology. On the other hand, more presentation channels are provided for the user to play the video information, so that the user can obtain better interaction experience and visual experience.

Figure 9:
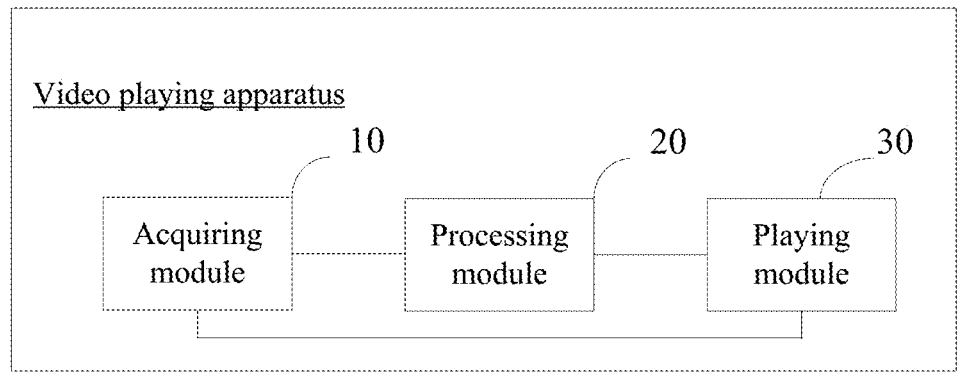
FIG. 9 is a structural block diagram of a video playing apparatus provided in an embodiment of the present disclosure.

Corresponding to the video playing methods of the foregoing embodiments, FIG. 9 is a structural block diagram of a video playing apparatus provided in an embodiment of the present disclosure. For ease of description, only the parts relevant to the embodiments of the present disclosure are shown. Referring to FIG. 9, the video playing apparatus includes an acquiring module 10, a processing module 20, and a playing module 30.

With the acquiring module 10, a user acquires a live-action shooting image. In an embodiment, the acquiring module may include an image acquiring apparatus equipped on the video playing apparatus, and may acquire a live-action shooting image by capturing the live-action image in real time. In addition, the acquiring module may further acquire, from a server or the video playing apparatus, the live-action shooting image stored or photographed by the server or the video playing apparatus, which would not be limited in the present disclosure.

The processing module 20 is configured to detect a target image in the live-action shooting image, and determine a display position of the target image in the live-action shooting image.

The playing module 30 is configured to acquire a target video associated with the target image, and play the target video at the display position of the target image in the live-action shooting image.

In an embodiment, the video playing apparatus further includes a first interacting module, configured to: determine, in response to a trigger operation from a user on the played target video, information being triggered and associated with the target video, so that the playing module 20 may present the information.

In an embodiment, the video playing apparatus further includes a second interacting module.

The second interacting module is configured to: receive at least one group of target images and target videos to be associated, that are uploaded by a user; and upload the at least one group of target images and target videos to be associated to a server for associated storage by the server for the target images and the target videos to be associated.

In an embodiment, the playing module 30 is, when acquiring the target video associated with the target image, specifically configured to: transmit the target image to the server, and receive a target video, which is associated with the target image, returned by the server.

In an embodiment, the live-action shooting image includes multiple target images therein. The playing module 30, when acquiring the target video associated with the target image and playing the target video at the display position of the target image in the live-action shooting image, is specifically configured to: store target videos associated with multiple target images in a preset video playlist according to an order in which the target videos associated with the multiple target images are acquired; determine, according to an order in which the respective target videos are stored in the video playlist, at least one target video from the video playlist as a target video to be played; and play the target video to be played, at a display position of a target image associated with the target video to be played.

In an embodiment, the time in which the target videos are acquired is further stored in the video playlist. The playing module 30 is, when storing the target videos associated with the multiple target images in the preset video playlist according to the order in which the target videos associated with the multiple target images are acquired, specifically configured to: store the respective target videos into the video playlist according to a temporal reverse order in which the target videos are acquired.

In an embodiment, the playing module 30 is, when playing the target videos to be played, specifically configured to: perform decoding processing on a respective target video to be played, to obtain audio data and video data of the respective target video to be played; play the video data of the respective target video to be played; and play audio data of a target video to be played that is most recently acquired and stored in the video playlist.

In an embodiment, the playing module 30 is, when playing the target video at the display position of the target image in the live-action shooting image, specifically configured to: determine a corresponding playing area in the live-action shooting image according to the display position; and perform video preprocessing on the target video according to the playing area, and play the target video in the playing area.

In an embodiment, the playing module 30 is, when performing the video preprocessing on the target video according to the playing area and playing the target video in the playing area, specifically configured to: perform three-dimensional space rendering processing on video data of the target video according to a spatial feature of the playing area in the live-action shooting image, so as to play the target video in the playing area.

In an embodiment, the display position includes: an image edge position, or/and an image vertex position.

In an embodiment, the playing module 30 is, when playing the target video, specifically configured to: acquire a playing progress of the target video; and play the target video according to the playing progress.

The video playing apparatus provided in the embodiments of the present disclosure is configured to perform the following method: acquiring a live-action shooting image; detecting a target image in the live-action shooting image; determining a display position of the target image in the live-action shooting image; acquiring a target video associated with the target image, and playing the target video at the display position of the target image in the live-action shooting image. According to the video playing apparatus provided by the embodiment of the invention, the production cycle and the cost can be reduced for presenting information using the augmented reality display technology. On the other hand, more presentation channels are provided for the user to play the video information, so that the user can obtain better interaction experience and visual experience.

An electronic device provide of the embodiment can be used to implement the technical solution of the foregoing method embodiments following similar implementation principles and producing similar technical effects, which will not be repeated in this embodiment.

Figure 10:
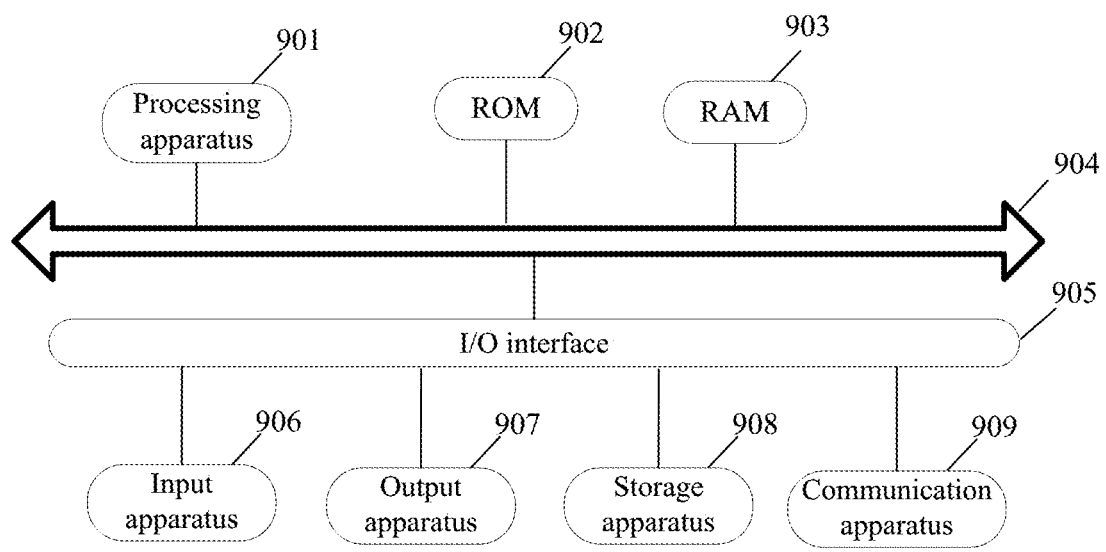
FIG. 10 is a schematic diagram of the hardware structure of an electronic device provided in an embodiment of the disclosure.

Reference may be made to FIG. 10, which shows a schematic structural diagram of an electronic device 900 suitable for implementing an embodiment of the present disclosure. The electronic device 900 may be a terminal device or a media library. The terminal device may include, but is not limited to, a mobile phone, a laptop computer, a digital broadcast receiver, a personal digital assistant (PDA), a portable android device (PAD), a portable media player (PMP), a vehicle-mounted terminal (e.g., a vehicle-mounted navigation terminal), a mobile terminal (e.g., a wearable electronic device), and a fixed terminal, such as a digital TV, a desktop computer, a smart home device, and the like. The electronic device shown in FIG. 10 is merely one example, and should not bring any limitation over the functions or applicable scope of the embodiments of the present disclosure.

As shown in FIG. 10, the electronic device 900 may include a processor 901 (such as a central processing unit, a graphics processor, etc.) for performing a video playing method. The processor 901 may perform various appropriate actions and procedures according to a program stored in a read only memory (ROM) 902, or a program loaded into a random access memory (RAM) 903 from a storage apparatus 908. In the RAM 903, various programs and data required for the operation of the electronic device 900 can also be stored thereon. The processor 901, the ROM 902, and the RAM 903 are mutually connected via a bus 904. An input/output (I/O) interface 905 is also connected to the bus 904.

Typically, the following apparatuses can be connected via an I/O interface 905: an input apparatus 906 such as a touch screen, a touch panel, a keyboard, a mouse, a camera, a microphone, an accelerometer, a gyroscope, etc.; an output apparatus 907 such as a liquid crystal display (LCD), a speaker, a vibrator, etc.; a storage apparatus 908 such as a magnetic tape, a hard disk, etc.; and a communication apparatus 909. The communication apparatus 909 may allow the electronic device 900 to perform wireless or wired communication with other devices to exchange data. Although FIG. 10 has shown an electronic device 900 having various apparatuses, it should be understood that not all of the illustrated apparatuses are required to be implemented or equipped. Alternatively, more or fewer apparatuses may be implemented or provided.

In particular, according to an embodiment of the present disclosure, the processes described above with reference to the flowcharts can be implemented as a computer software program. For example, an embodiment of the present disclosure includes a computer program product including a computer program carried on a computer-readable medium, the computer program including program codes for performing the method shown in the various flowcharts according to embodiments of the present disclosure. In such an embodiment, the computer program may be downloaded and installed from a network via the communication apparatus 909, or be installed from the storage apparatus 908, or installed from the ROM 902. When the computer program is executed by the processor 901, the functions defined in the methods of the embodiments of the present disclosure are performed. An embodiment of the present disclosure further includes a computer program which is, when being executed by a processor, configured to perform the functions defined in the methods of the embodiments of the present disclosure.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include, but not limited to, an electrical connection having one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any suitable combination thereof. In the present disclosure, the computer-readable storage medium may be any tangible medium that contains or stores a program that may be used by, or in combination with, an instruction execution system, apparatus, or device. In the present disclosure, the computer-readable signal medium may include a data signal propagating in a baseband or as part of a carrier and carrying computer accessible program codes. This propagating data signal can take many forms, including but not limited to electromagnetic signals, optical signals, or any suitable combination of the foregoing. The computer-readable signal medium may also be any computer-readable medium beyond the computer-readable storage medium. The computer-readable signal medium may transmit, pass out, or transfer a program for use by or in combination with the instruction execution system, apparatus, or device. The program codes contained in the computer-readable medium may be transmitted by any suitable medium, including but not limited to: an electric wire, an optical cable, a radio frequency (RF), etc., or any suitable combination of the foregoing.

The above-mentioned computer-readable medium may be included in the above-mentioned electronic device; or it may exist independently without being integrated into the electronic device.

The computer-readable medium carries one or more programs which, when being executed by the electronic device, causes the electronic device to execute the method shown in the foregoing embodiments.

The computer program codes used to perform the operations of the present disclosure may be written in one or more programming languages or a combination thereof. The programming languages may include object-oriented programming languages such as Java, Smalltalk, C++, and/or conventional procedural programming languages such as C or similar programming languages. The program codes may be executed entirely or partly on a user's computer, as a stand-alone software package, partly on the user's computer and partly on a remote computer, or entirely on the remote computer or a media library. The remote computer as such can be connected to the user's computer via any kind of network, including a local area network (LAN) or a wide area network (WAN). Or, the remote computer can be connected to an external computer (e.g., using an Internet service provider to connect via the Internet).

The flowcharts and block diagrams in the accompanying drawings illustrate the possible implementation architectures, functions, and operations of the system, method, and computer program product according to various embodiments of the present disclosure. In this regard, each block in the flowchart or block diagram may represent a module, a program segment, or a part of codes which contain one or more executable instructions for realizing a specified logical function. It should also be noted that, in some alternative implementations, the functions identified in the blocks may also happen in an order different from the order shown in the drawings. For example, two blocks shown in succession can actually be executed substantially in parallel, and they can sometimes be executed in a reverse order, depending on the functions involved. It should also be noted that individual blocks or their various combinations in a block diagram and/or a flowchart can be implemented by a dedicated hardware-based system that performs specified functions or operations, or be implemented by a combination of dedicated hardware and computer instructions.

The units involved in the embodiments described in the present disclosure can be implemented in software or hardware. The naming of the units does not constitute a limitation on the unit itself under certain circumstances. For example, a first acquiring unit can also be referred to as a "unit for acquiring at least two Internet Protocol addresses".

The functions described hereinabove may be performed at least in part by one or more hardware logic components. For example rather than limitation, exemplary hardware logic components that may be used include a field programmable gate array (FPGA), an application specific integrated circuit (ASIC), an application specific standard product (ASSP), a system-on-chip (SoC), a complex programmable logic device (CPLD), etc.

In the context of this disclosure, a machine-readable medium may be a tangible medium, which can contain or store a program for use by, or in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples the machine-readable storage medium would include an electrical connection based on one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any suitable combination of the foregoing. The following are some embodiments of the present disclosure.

In a first aspect, according to one or more embodiments of the present disclosure, a video playing method includes:
  acquiring a live-action shooting image;
  detecting a target image in the live-action shooting image;
  determining a display position of the target image in the live-action shooting image;

acquiring a target video associated with the target image, and playing the target video at the display position of the target image in the live-action shooting image.

In an embodiment, the method further includes:
determining, in response to a trigger operation from a user on the played target video, information being triggered and associated with the target video;
presenting the information.

In an embodiment, the method further includes:
receiving at least one group of target images and target videos to be associated, that are uploaded by a user;
uploading the at least one group of target images and target videos to be associated to a server for associated storage by the server for the target images and the target videos to be associated.

In an embodiment, the acquiring the target video associated with the target image includes:
transmitting the target image to a server;
receiving a target video, which is associated with the target image, returned by the server.

In an embodiment, the live-action shooting image includes multiple target images therein.

The acquiring the target video associated with the target image and the playing the target video at the display position of the target image in the live-action shooting image include:
storing target videos associated with the multiple target images in a preset video playlist according to an order in which the target videos associated with the multiple target images are acquired;
determining, according to an order in which the respective target videos are stored in the video playlist, at least one target video from the video playlist as a target video to be played;
playing the target video to be played, at a display position of a target image associated with the target video to be played.

In an embodiment, the time in which the target videos are acquired is further stored in the video playlist.

The storing the target videos associated with the multiple target images in the preset video playlist according to the order in which the target videos associated with the multiple target images are acquired includes:
storing the respective target videos into the video playlist according to a temporal reverse order in which the respective target videos are acquired.

In an embodiment, the playing the target video to be played includes:
performing decoding processing on a respective target video to be played, to obtain audio data and video data of the respective target video to be played;
playing the video data of the respective target video to be played; and
playing audio data of a target video to be played that is most recently acquired and stored in the video playlist.

In an embodiment, the playing the target video at the display position of the target image in the live-action shooting image includes:
determining a corresponding playing area in the live-action shooting image according to the display position;
performing video preprocessing on the target video according to the playing area, and playing the target video in the playing area.

In an embodiment, the performing the video preprocessing on the target video according to the playing area and the playing the target video in the playing area include:
performing three-dimensional space rendering processing on video data of the target video according to a spatial feature of the playing area in the live-action shooting image, so as to play the target video in the playing area.

In an embodiment, the display position includes: an image edge position, or/and an image vertex position.

In an embodiment, the playing the target video includes:
acquiring a playing progress of the target video;
playing the target video according to the playing progress.

In a second aspect, according to one or more embodiments of the present disclosure, a video playing apparatus includes: an acquiring module, a processing module, and a playing module.

The acquiring module is configured to acquire a live-action shooting image for a user.

The processing module is configured to: detect a target image in the live-action shooting image, and determine a display position of the target image in the live-action shooting image.

The playing module is configured to: acquire a target video associated with the target image, and play the target video at the display position of the target image in the live-action shooting image.

In an embodiment, the video playing apparatus further includes a first interacting module.

The first interacting module is configured to: determine, in response to a trigger operation from a user on the played target video, information being triggered and associated with the target video, so that the playing module may present the information.

In an embodiment, the video playing apparatus further includes a second interacting module.

The second interacting module is configured to: receive at least one group of target images and target videos to be associated, that are uploaded by a user; and upload the at least one group of target images and target videos to be associated to a server for associated storage by the server for the target images and the target videos to be associated.

In an embodiment, the playing module is, when acquiring the target video associated with the target image, specifically configured to: transmit the target image to the server, and receive a target video, which is associated with the target image, returned by the server.

In an embodiment, the live-action shooting image includes multiple target images therein. The playing module, when acquiring the target video associated with the target image and when playing the target image at the display position in the live-action shooting image, is specifically configured to: store target videos associated with multiple target images in a preset video playlist according to an order in which the target videos associated with the multiple target images are acquired; determine, according to an order in which the respective target videos are stored in the video playlist, at least one target video from the video playlist as a target video to be played; and play the target video to be played, at a display position of a target image associated with the target video to be played.

In an embodiment, the time in which the target videos are acquired is further stored in the video playlist. The playing module is, when storing the target videos associated with the multiple target images in the preset video playlist according to the order in which the target videos associated with the multiple target images are acquired, specifically configured to: store the respective target videos into the video playlist according to a temporal reverse order in which the respective target videos are acquired.

In an embodiment, the playing module is, when playing the target video to be played, specifically configured to: perform decoding processing on a respective target video to be played to obtain audio data and video data of the respective target video to be played; play the video data of the respective target video to be played; and play audio data of a target video that is most recently acquired and stored in the video playlist.

In an embodiment, the playing module is, when playing the target video at the display position of the target image in the live-action shooting image, specifically configured to: determine a corresponding playing area in the live-action shooting image according to the display position; and perform video preprocessing on the target video according to the playing area, and play the target video in the playing area.

In an embodiment, the playing module is, when performing the video preprocessing on the target video according to the playing area and playing the target video in the playing area, specifically configured to: perform three-dimensional space rendering processing on video data of the target video according to a spatial feature of the playing area in the live-action shooting image, so as to play the target video in the playing area.

In an embodiment, the display position includes: an image edge position, or/and an image vertex position.

In an embodiment, the playing module is, when playing the target video, specifically configured to: acquire a playing progress of the target video; and play the target video according to the playing progress.

In a third aspect, according to one or more embodiments of the present disclosure, an electronic device includes: at least one processor and a memory,
    where the memory stores therein computer executable instructions; and
    the at least one processor executes the computer executable instructions stored in the memory to cause the at least one processor to execute the video playing method according to any of the foregoing.

In a fourth aspect, according to one or more embodiments of the present disclosure, a computer readable storage medium stores therein computer executable instructions which, when being executed by a processor, implement the video playing method according to any of the foregoing.

In a fifth aspect, according to one or more embodiments of the present disclosure, a computer program product includes a computer program which, when being executed by a processor, implements the video playing method according to any of the foregoing.

In a sixth aspect, according to one or more embodiments of the present disclosure, a computer program which, when being executed by a processor, implements the video playing method according to any of the foregoing.

The above descriptions are only preferred embodiments of the present disclosure and explanations of the applicable technical principles. Those skilled in the art should understand that the scope of disclosure involved herein is not limited to the technical solutions formed by the particular combinations of the above technical features. Rather, the scope of disclosure should encompass other technical solutions formed by arbitrarily combining above technical features, or other features equivalent thereto, without departing from the above disclosed concepts. Examples may include technical solutions formed by replacing the above features with other technical features disclosed in the present disclosure (but not limited hereto) having similar functions.

In addition, although the operations have been depicted in some specific orders, this should not be understood as requiring these operations to be performed in those specific orders, or any sequential order at all. Under some circumstances, multi-tasking and parallel processing may be advantageous. Likewise, although several specific implementation details have been included in the above discussions, they should not be construed as limiting the scope of the present disclosure. Certain features that are described in the context of separate embodiments can also be implemented in combination in a single embodiment. Conversely, various features described in the context of a single embodiment can also be implemented in multiple embodiments separately or as suitable sub-combinations.

Although the subject matter has been described in terms specific to structural features and/or logical actions of methods, it should be understood that the subject matter defined in the appended claims is not necessarily limited to the specific features or actions described above. Rather, the specific features and actions described above are merely exemplary forms implementing the claims.

What is claimed is:

1. A video playing method, comprising:
    acquiring a live-action shooting image;
    detecting a target image in the live-action shooting image;
    determining a display position of the target image in the live-action shooting image;
    acquiring a target video associated with the target image, and playing the target video at the display position of the target image in the live-action shooting image;
    wherein the playing the target video at the display position of the target image in the live-action shooting image comprises:
        determining a corresponding playing area in the live-action shooting image according to the display position; and
        performing video preprocessing on the target video according to the playing area, and playing the target video in the playing area.

2. The video playing method according to claim 1, further comprising:
    determining, in response to a trigger operation from a user on the played target video, information being triggered and associated with the target video; and
    presenting the information.

3. The video playing method according to claim 1, further comprising:
    receiving at least one group of target images and target videos to be associated, that are uploaded by a user; and
    uploading the at least one group of target images and target videos to be associated to a server for associated storage by the server for the target images and the target videos to be associated.

4. The video playing method according to claim 3, wherein the acquiring the target video associated with the target image comprises:
    transmitting the target image to the server; and
    receiving a target video, which is associated with the target image, returned by the server.

5. The video playing method according to claim 1, wherein the live-action shooting image comprises multiple target images therein; and
    the acquiring the target video associated with the target image and the playing the target video at the display position of the target image in the live-action shooting image comprises:

storing target videos associated with the multiple target images in a preset video playlist according to an order in which the target videos associated with the multiple target images are acquired;

determining, according to an order in which the respective target videos are stored in the video playlist, at least one target video from the video playlist as a target video to be played; and playing the target video to be played, at a display position of a target image associated with the target video to be played.

6. The video playing method according to claim 5, wherein a time in which the target videos are acquired is further stored in the video playlist; and the storing the target videos associated with the multiple target images in the preset video playlist according to the order in which the target videos associated with the multiple target images are acquired comprises:

storing the respective target videos into the video playlist according to a temporal reverse order in which the respective target videos are acquired.

7. The video playing method according to claim 5, wherein the playing the target video to be played comprises:

performing decoding processing on a respective target video to be played, to obtain audio data and video data of the respective target video to be played;

playing the video data of the respective target video to be played; and playing audio data of a target video to be played that is most recently acquired and stored in the video playlist.

8. The video playing method according to claim 1, wherein the performing the video preprocessing on the target video according to the playing area and the playing the target video in the playing area comprises:

performing three-dimensional space rendering processing on video data of the target video according to a spatial feature of the playing area in the live-action shooting image, so as to play the target video in the playing area.

9. The video playing method according to claim 1, wherein the display position comprises: an image edge position, or/and an image vertex position.

10. The video playing method according to claim 1, wherein the playing the target video comprises:

acquiring a last playing progress of the target video; and playing the target video according to the last playing progress.

11. An electronic device, comprising:
at least one processor; and
a memory;
wherein the memory stores therein computer executable instructions; and
the at least one processor executes the computer executable instructions stored in the memory to cause the at least one processor to:
acquire a live-action shooting image;
detect a target image in the live-action shooting image;
determine a display position of the target image in the live-action shooting image;
acquire a target video associated with the target image, and play the target video at the display position of the target image in the live-action shooting image;
determine a corresponding playing area in the live-action shooting image according to the display position; and
perform video preprocessing on the target video according to the playing area, and play the target video in the playing area.

12. The electronic device according to claim 11, wherein the at least one processor is further caused to:

determine, in response to a trigger operation from a user on the played target video, information being triggered and associated with the target video; and present the information.

13. The electronic device according to claim 11, wherein the at least one processor is further caused to:

receive at least one group of target images and target videos to be associated, that are uploaded by a user;

upload the at least one group of target images and target videos to be associated to a server for associated storage by the server for the target images and the target videos to be associated;

transmit the target image to the server; and receive a target video, which is associated with the target image, returned by the server.

14. The electronic device according to claim 11, wherein the live-action shooting image comprises multiple target images therein; and the at least one processor is further caused to:

store target videos associated with the multiple target images in a preset video playlist according to an order in which the target videos associated with the multiple target images are acquired;

determine, according to an order in which the respective target videos are stored in the video playlist, at least one target video from the video playlist as a target video to be played; and play the target video to be played, at a display position of a target image associated with the target video to be played.

15. The electronic device according to claim 14, wherein a time in which the target videos are acquired is further stored in the video playlist; and the at least one processor is further caused to:

store the respective target videos into the video playlist according to a temporal reverse order in which the respective target videos are acquired;

perform decoding processing on a respective target video to be played, to obtain audio data and video data of the respective target video to be played;

play the video data of the respective target video to be played; and play audio data of a target video to be played that is most recently acquired and stored in the video playlist.

16. The video playing method according to claim 11, wherein the at least one processor is further caused to:

perform three-dimensional space rendering processing on video data of the target video according to a spatial feature of the playing area in the live-action shooting image, so as to play the target video in the playing area.

17. The video playing method according to claim 11, wherein the display position comprises: an image edge position, or/and an image vertex position.

18. The video playing method according to claim 11, wherein the playing the target video comprises:

acquiring a last playing progress of the target video; and playing the target video according to the last playing progress.

19. A non-transitory computer-readable storage medium, storing therein computer executable instructions which, when executed by a processor, implement the steps of:

acquiring a live-action shooting image;

detecting a target image in the live-action shooting image;

determining a display position of the target image in the live-action shooting image;

acquiring a target video associated with the target image, and playing the target video at the display position of the target image in the live-action shooting image;

determining a corresponding playing area in the live-action shooting image according to the display position; and performing video preprocessing on the target video according to the playing area, and play the target video in the playing area.

* * * * *